Dec. 17, 1946.    G. W. DE BELL ET AL    2,412,566
TURNBUCKLE FAIRING AND LOCK
Filed June 20, 1942    2 Sheets-Sheet 1
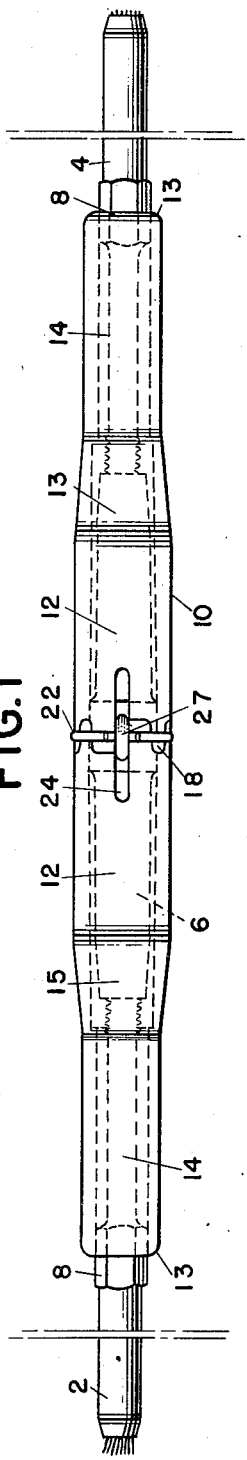
FIG. 1
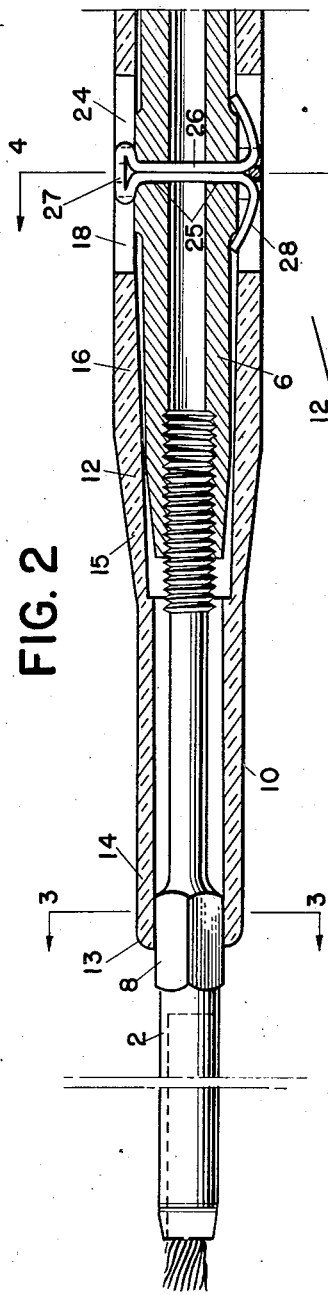
FIG. 2
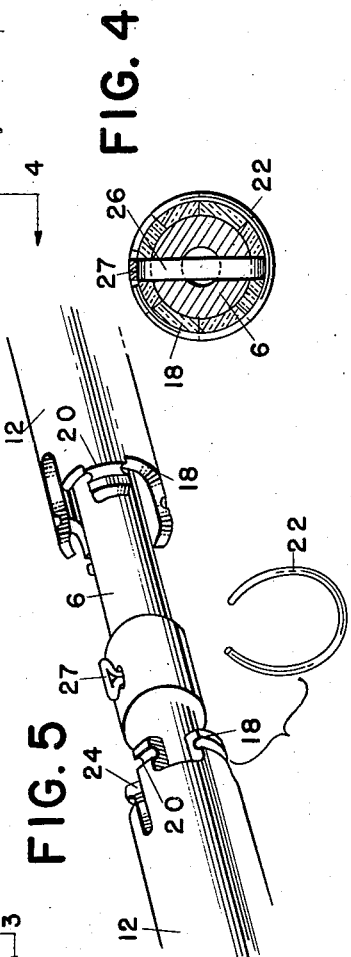
FIG. 3    FIG. 4    FIG. 5
INVENTOR
GEORGE W. DE BELL
THOMAS C. HILL
BY 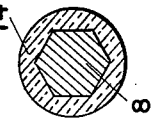
ATTORNEY

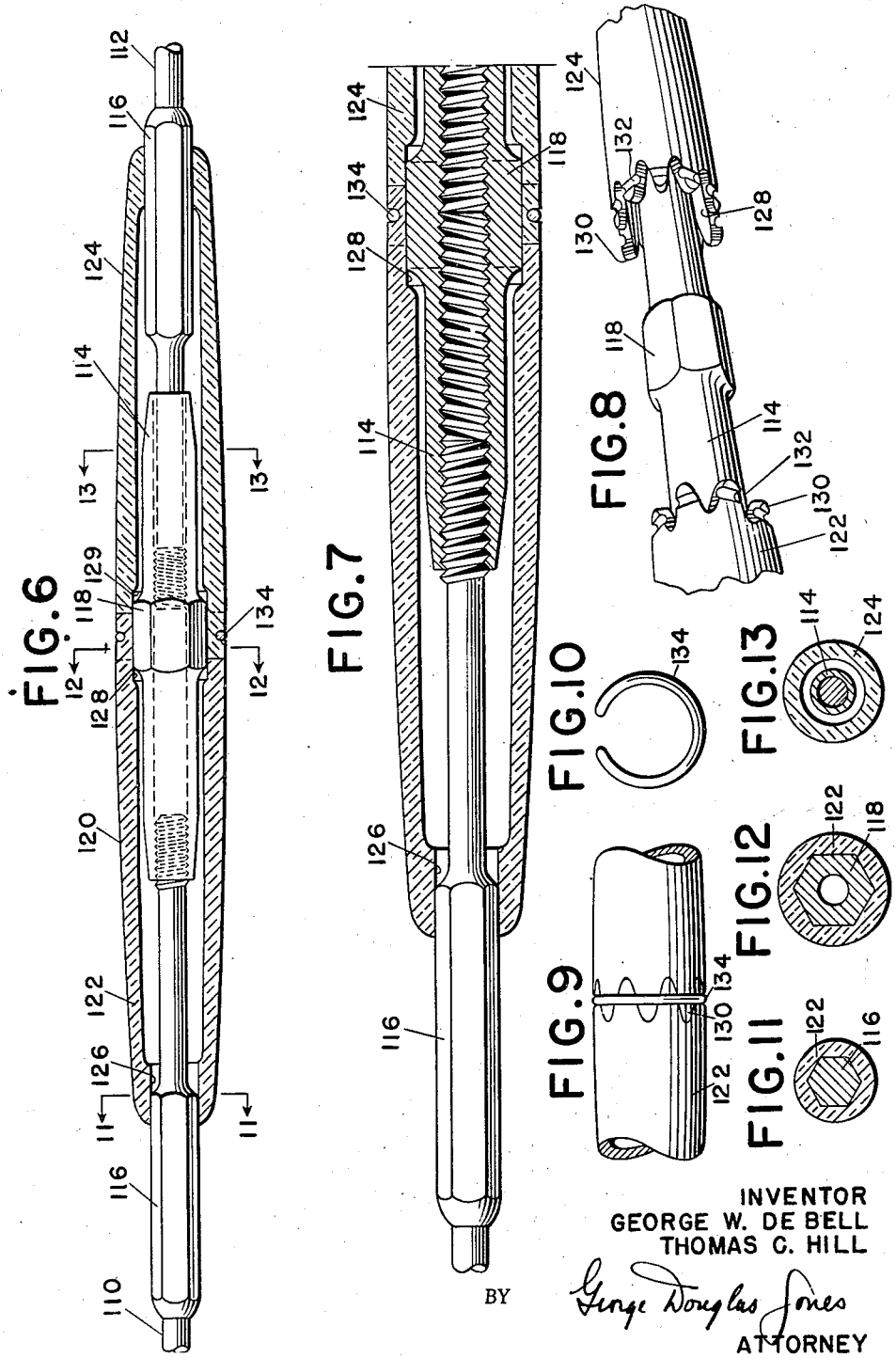

Patented Dec. 17, 1946

2,412,566

UNITED STATES PATENT OFFICE 2,412,566

TURNBUCKLE FAIRING AND LOCK

George W. De Bell, Middle River, and Thomas C. Hill, Baltimore, Md., assignors to The Glenn L. Martin Company, Middle River, Md., a corporation of Maryland Application June 20, 1942, Serial No. 447,876

13 Claims. (Cl. 287—60)

This invention relates to turnbuckles and particularly to the safetying of aircraft turnbuckles which must be frequently inspected and adjusted.

An aircraft turnbuckle assembly consists of a barrel portion, a left-hand cable terminal and a right-hand cable terminal. It is usually adjusted and then locked in the adjusted position by means of safety wire. The safety wire is wrapped about the parts of the assembly in a manner that will prevent the cable terminals from turning in relation to each other or the barrel portion. The ultimate object of the safety wire is to prevent the relative rotation of the turnbuckle assembly parts when they are subjected to strain or vibration.

Safetying aircraft turnbuckles with wire necessitates the complete removal and replacement of the safetying wire each time the turnbuckle is adjusted.

Unless a mechanic skilled in the method of adjusting and wire-safetying turnbuckles is employed for this operation it is quite possible that the safetying wire will not be correctly wrapped in the right direction about the turnbuckle assembly and that the said asssembly will work loose when subject to the usual aircraft vibrations and strains.

Wire-safetied turnbuckles by nature are rough surfaced assemblies not unlike knots in a rope or cable. The aircraft industry spends countless hours each year designing structure wherein cables containing "knotty" turnbuckles will not interfere with other like cables or the structure itself, in their travels within an airplane. This disadvantage has proved most costly to aircraft manufacturers not only from the standpoint of the expense incurred in the attempt to design a turnbuckle assembly free from such protuberances, but also from the fact that numerous crack-ups have been traced directly to fouled turnbuckles in the control cables as well as other cables, the free movement of which is obviously imperative.

We have discovered that all of the aforementioned undesirable features inherent in present aircraft turnbuckle practice can be eliminated if a turnbuckle is safetied by means of sleeve sections of transparent plastic material which are castellated at one end and have hexagonal or other suitable interior cable terminal gripping surfaces at the other end.

It should be understood that the surfaces of the cable terminals need not be of hexagonal shape to provide adequate gripping surfaces for the purpose of adjustment but that they could be of any external shape. The interior surfaces of our sleeve sections can likewise be made in any desired shape.

These sleeve sections are preferably made of transparent plastic material when applied to aircraft turnbuckles to facilitate inspection. However, they can be fashioned out of any other suitable material such as metal or wood.

Each sleeve section is placed over its respective half of a turnbuckle assembly, and after the turnbuckle has been adjusted to final position, the sleeve sections are brought together by means of a snap ring set in a groove extending around the intermeshed castellations.

Turnbuckles are ordinarily provided with cable terminals having external hexagonal or like gripping surfaces for the purposes of adjusting the turnbuckle. The inner hexagonal portions of our sleeve sections fit over these external hexagonal terminal portions so that relative rotation is prevented.

Turnbuckle barrels are usually provided with an aperture or hole near their centers through which the safetying wire is threaded. However, in our invention we insert a cotter pin through this hole in the turnbuckle barrel.

Appropriate slots to receive the cotter pin are provided in our transparent plastic sleeve sections. Thus, each of the sleeve sections prevent rotation between the barrel and one of the hexagonal-shaped cable terminal gripping surfaces by its slotted engagement of the cotter pin and its inner hexagonal engagement of the external hexagonal cable terminal surface. Each sleeve section therefore prevents rotation between the turnbuckle barrel and the hexagonal cable terminal surface which it covers.

Inasmuch as our sleeve sections have smooth outer surfaces, the two sections when locked together over a turnbuckle assembly form a smooth fairing cover for it.

The primary object of this invention is to provide a smooth, transparent plastic, well-faired turnbuckle cover which may be used to safety aircraft turnbuckles.

Another object of the invention is to provide a locking means for turnbuckle assemblies that allows easy access for adjustment purposes.

Still another object of the invention is to provide a smooth-surfaced transparent cover-lock for turnbuckle assemblies that will permit inspection therethrough.

A further object of the invention is to provide a slide-on safetying cover-lock for turnbuckle assemblies.

Still another object of the invention is to provide a safetying means for aircraft turnbuckles that will positively prevent all relative movement between the different parts of the turnbuckle assembly.

Further objects of the present invention will become more apparent from the description of the accompanying drawings which form a part of this disclosure and wherein like reference numbers refer to like parts. It is to be understood that certain changes, substitutions, alterations and modifications may be made without departing from the spirit and scope of the appended claims.

In the drawings in which like reference numerals indicate like parts:

Fig. 1 is a plan view of the invention;

Fig. 2 is an enlarged longitudinal cross-sectional view of a portion of Fig. 1;

Fig. 3 is a cross-sectional view along the plane indicated by the line 3—3, Fig. 2.

Fig. 4 is a cross-sectional view along the plane indicated by the line 4—4, Fig. 2;

Fig. 5 is a perspective view illustrating the method of assembling the parts of the cover into position upon the turnbuckle.

Figs. 6 to 13 show similar views of a modified form of the invention.

In Figs. 1, 2 and 5 the turnbuckle is composed of cable terminals 2 and 4 threaded to a barrel portion 6. Each of the cable terminals 2 and 4 are provided with a hexagonal nut portion 8 by means of which the cable terminals are adjusted in the barrel portion 6 and with respect to each other. This is conventional turnbuckle construction.

The self-locking fairing cover 10 of this invention is shown covering the turnbuckle between the nut portions 8. This cover is made in two sleeve half sections 12, each of which is similar or identical to the other and each of which is composed of a narrow cylindrical portion 14, the inner surface of which is hexagonally shaped so that it closely fits over the nut portion 8, note Fig. 3, and an enlarged portion 16 terminating in a castellated end 18, the castellations of one of the sections being complementary to the castellations in the other section. The castellated portions 18 also include a peripheral groove 20 which is adapted to receive a resilient snap ring 22, when the castellations are meshed with each other. The castellations further include a pair of diametrically opposed elongated slots 24 which are adapted to receive the ends of a cotter pin 26.

Cover 10 may be made of metal or any other suitable material, but is preferably made of a transparent moldable substance so that after it has been placed in position the turnbuckle can be readily inspected. Any of the synthetic resins which are transparent and are capable of being molded, and have the necessary strength are suitable for this purpose. The free ends 13 of narrow portion 14 are rounded so they will slip by any obstruction. For a similar reason the transition part 15 of the cover between narrow portion 14 and wide portion 16 is formed as a gradually inclined smooth surface.

The operation of the device is as follows:

Before the cable terminals 2 and 4 are screwed into the barrel portion 6, a sleeve section 12 is slipped over each cable terminal and down the cable connected to each cable terminal. The cable terminals then are screwed into the barrel portion 6, which has cotter pin 26 already installed in hole 25 as in Fig. 2, and adjusted to final position by means of the hexagonal nut portions 8. The sleeve sections are then slid over their respective parts of the turnbuckle and are brought together with their castellations meshed adjacent the barrel portion of member 6, and with their elongated slots 24 in alignment with the cotter pin 26 through the member 6. The head 27 and outwardly bent legs 28 of the cotter pin lie below the outer surface of the sleeve section or cover and do not project outwardly thereof, and prevent the cover 10 from rotating with respect to the barrel portion 6. Sleeve sections 12 are held in meshed relation by means of the resilient ring 22 snapped into position in the groove 20.

The inner hexagonal surfaces of portions 14 are engaged with the hexagonal nut portions 8 so that the sleeve sections cannot turn with respect to the cable terminals 2 and 4. Inasmuch as they cannot turn with respect to their cable terminals, and cannot turn with respect to barrel portion 6, it is obvious that the cover effectively locks the cable terminals 2 and 4 against turning with respect to barrel portion 6 and, therefore, effectively locks the turnbuckle assembly.

As the cover presents a smooth exterior surface, no projection exists which can catch upon any adjacent cable or structural member.

The invention illustrated in Figs. 6 to 13 is a simplified modification of the aforementioned structure in that internal hexagonal or other irregular surfaces positioned adjacent the castellated ends of the transparent sleeve sections, which are adapted to co-act with external hexagonal or other irregular surfaces of the barrel portion when moved into inter-meshed relation, are substituted for the cotter pin.

Turnbuckles are ordinarily provided with cable terminals having external hexagonal or like gripping surfaces for the purpose of adjusting the turnbuckle. The internal hexagonal portions located at the outer ends of the sleeve sections fit over these external hexagonal terminal portions so that relative movement between the two terminals is prevented.

As shown in the drawings, the sleeve sections are held against movement along the longitudinal axis of the turnbuckle by means of the central barrel portion contacting the flared portion of the internal hexagonal portion of the sleeve sections.

Thus it will be seen that the internal hexagonal portions of the transparent fairing and locking sleeves co-act with the corresponding external hexagonal surfaces of the turnbuckle so as to prevent relative movement between the component parts of the entire unit.

Referring to the drawings and more particularly to Figure 6 thereof, the turnbuckle is composed of cable terminals 110 and 112 adapted to be threaded to a barrel portion 114. Each of the cable terminals 110 and 112 is provided with a hexagonal nut portion 116 by means of which the cable terminals are adjusted in the barrel portion 114 with respect to each other. This is conventional turnbuckle construction. In the present invention, the barrel portion 114 is further provided with a hexagonal portion 118, the function of which is later to be described.

The self-locking fairing cover 120 of this invention is shown covering the turnbuckle between the nut portions 116. This cover is made in two sleeve portions 122 and 124, each of which is similar or identical to the other and each of which has an internal hexagonally-shaped surface 126 and 128 respectively at each end thereof and a castellated portion 130 at their abutting ends, the castellations of one of the sections being complementary to the castellations of the other section. The castellated portions 130 also include a peripheral groove 132 which is adapted to receive, when the castellations are intermeshed, a resilient snap ring 134.

Cover 120 may be made of metal or any other suitable material, but is preferably made of a transparent substance to permit of ready inspection without the necessity of disassembling. Any of the synthetic resins which are transparent and capable of being molded, and having the necessary strength, are suitable for this purpose. The outer ends of the sleeve portions 122 and 124 are rounded so they will slip by any obstruction. For a similar reason, it will likewise be noted that the gradually inclined surfaces of the connected sleeve portions 122 and 124 present a smooth contour.

The operation of the device is as follows:

Before the cable terminals 110 and 112 are screwed into the barrel portion 114, the sleeve portions 122 and 124 are slipped over each cable terminal. The cable terminals are then screwed into the barrel portion 114 and adjusted to a predetermined position. The sleeve portions are then slid over their respective parts of the turnbuckle and are brought together with their castellations intermeshed adjacent the hexagonal surfaces of the barrel portion 114. Snap ring 134 is then inserted in peripheral groove 132.

Therefore, as the internal hexagonal portions 126 are engaged with the hexagonal nut surface 116 so that the sleeve portions cannot turn with respect to the cable terminals 110 and 112 and as the internal hexagonal portions 128 of the sleeves are engaged with the external hexagonal surfaces 118 of the barrel portion 114 so that the sleeve portions cannot turn with relation to the barrel portion 114, it is obvious that the cover effectively locks the component parts of the turnbuckle assembly and associated fairing and locking means from any relative movement, and this without the use of a cotter pin. It will be noted that sleeves 122 and 124 are held against movement along the longitudinal axis of the turnbuckle by means of the central barrel portion 118 contacting the flared portion 128 of the sleeve portions 122 and 124.

The term "turnbuckle" as used in this application comprehends a central barrel portion, terminals adapted to be adjustably positioned in the ends of the central barrel portion, and means to lock the aforementioned parts from relative movement.

We claim as our invention:

1. A turnbuckle fairing cover comprising a pair of transparent plastic sleeves having an interior shape complementary to the exterior shape of a turnbuckle, means for locking said sleeve portions against translation with respect to each other and means for locking said locked sleeve portions against rotation with any part of the turnbuckle not restrained by the complementary shape of the overlying sleeve portions, both said locking means being within the streamlined surface of said sleeve.

2. A cover-lock for turnbuckles comprising a pair of sleeve sections each adapted to cover a part of a turnbuckle assembly, means for locking said sleeve portions against translation with respect to each other, and means for locking each of said sleeve sections against rotation with respect to each part of the turnbuckle assembly, both said locking means being within the streamlined surface of said sleeve.

3. In combination, a turnbuckle comprising a pair of cable terminals having adjusting portions of polygonal cross-section, a barrel portion uniting said cable terminals, and a pair of transparent plastic sleeve portions each enclosing part of said barrel portion and part of said adjusting portions, said sleeve portions being separably joined together adjacent the midpoint of said turnbuckle, and each of said sleeve portions having a portion of its inner surface enclosing one of said adjusting portions shaped to conform therewith, said sleeve portions being slotted near their jointure to conform with a projection on said turnbuckle barrel portion so that when engaged said portions prevent the rotation of the respective turnbuckle parts with each other.

4. A turnbuckle cover-lock comprising a pair of identical transparent plastic sleeve members having a relatively small tubular portion joined by a smoothly inclined portion to a relatively large tubular portion, means for locking the ends of the said large portions to each other and to a turnbuckle barrel portion, and means for locking the said small portions to the cable terminals of a turnbuckle assembly.

5. In combination, a turnbuckle, a transparent fairing and locking cover for said turnbuckle, and means integral with said turnbuckle and means integral with said fairing and locking cover for locking said turnbuckle and fairing and locking cover against relative rotational movement.

6. In combination, a turnbuckle having a barrel portion and cable terminals adjustably carried by said barrel portion, a cover for said barrel portion and at least a part of said cable terminals, and means integral with said cover and means integral with said turnbuckle for locking said cable terminals, barrel portion and cover against relative rotational movement.

7. In combination, a turnbuckle having a barrel portion, cable terminals adjustably carried by said barrel portion, and a transparent fairing and locking means covering said turnbuckle and at least a portion of said cable terminals, said barrel portion and said cable terminals having an external irregular cross section, said transparent fairing and locking means having corresponding internal surfaces, said internal and external surfaces adapted to co-act to lock said barrel portion, cable terminals and transparent fairing against relative movement.

8. A locking and fairing cover for a turnbuckle having threaded cable terminals and a central barrel portion into which the threaded cable terminals are screwed, said locking and fairing cover comprising two parts into which the turnbuckle is adapted to be positioned; the barrel portion and the cable terminals of the turnbuckle having polygonal cross-section portions, the abutting ends of said fairing cover being provided with similar interlocking ends to prevent relative rotational movement, the outer ends of said fairing cover being provided with internal surfaces conforming with said polygonal portions, and means for locking the abutting ends of the fairing cover against longitudinal movement.

9. A locking and fairing cover for a turnbuckle having threaded cable terminals and a central barrel portion into which the threaded cable terminals are screwed, said locking and fairing cover comprising two parts into which the turnbuckle is adapted to be positioned; the barrel portion and the cable terminals of the turnbuckle having polygonal cross-section portions, the abutting ends of said fairing cover being castellated to prevent relative rotational movement, the outer ends of said fairing cover being provided with internal surfaces conforming with said polygonal portions, and means for locking the abutting ends of the fairing cover against longitudinal movement.

10. A fairing cover for a turnbuckle, said turnbuckle comprising threaded cable terminals and a central barrel portion into which the threaded terminals are screwed, said fairing cover comprising two abutting hollow members adapted to receive said turnbuckle, the barrel portion and cable terminals having polygonal cross-section portions, the inner surfaces of said fairing cover members adjacent said polygonal portions shaped to conform with the polygonal portions, and a flush locking means for securing the abutting ends of said fairing cover members together.

11. A pair of sleeves fittable around a turnbuckle body, and means locking said sleeves against separation and against relative rotation, said sleeves each having a polygonal interior portion, and a rod having an axial screwthreaded connection with each end of the turnbuckle body, each of said rods having an integral polygonal portion received slidably by said interior polygonal portion of one of said sleeves.

12. The combination, with a turnbuckle body having a diametrically enlarged midlength portion thereby providing therearound at each side of said midlength portion an outwardly facing annular shoulder; of a pair of interchangeable locking sleeves each of which is interiorly contoured to substantially fit the outline of said turnbuckle body with their ends abutting against each other, and means locking the abutting ends of said sleeves against separation by shifting outwardly and against relative rotation, said sleeves each having a polygonal interior portion, and a rod having an axial screwthreaded connection with each end of the turnbuckle body, each of said rods having an integral polygonal portion received by said interior polygonal portion of one of said sleeves.

13. A pair of twin sleeves fittable around a turnbuckle body having a diametrically enlarged midlength portion thereby providing therearound at each side of said midlength portion an outwardly facing annular shoulder, and means locking said sleeves against separation by shifting outwardly and against relative rotation, said sleeves each having a polygonal interior portion, and a rod having an axial screwthreaded connection with each end of the turnbuckle body, each of said rods having an integral polygonal portion received adjustably by said interior polygonal portion of one of said sleeves.

GEORGE W. DE BELL.
THOMAS C. HILL.